United States Patent
Felipe et al.

(10) Patent No.: US 10,683,576 B2
(45) Date of Patent: *Jun. 16, 2020

(54) CORROSION INHIBITORS FOR PASSIVATION OF GALVANIZED COATINGS AND CARBON STEEL

(71) Applicant: Baker Hughes, a GE company, LLC, Houston, TX (US)

(72) Inventors: Mary Jane Legaspi Felipe, Sugar Land, TX (US); Timothy Ray Underwood, Cypress, TX (US); Albert Sidney Dunn, Lake Charles, LA (US); David N. Fulmer, Missouri City, TX (US); Montgomery A. Pifer, Kingwood, TX (US); Stephen J. Wiacek, Wallingford, PA (US); Khac Truc Nguyen, Houston, TX (US); William Mansfield, Houston, TX (US); William Watson, Houston, TX (US); Chelsea Eaton, Katy, TX (US)

(73) Assignee: Baker Hughes, a GE company, LLC, Houston, TX (US)

(*) Notice: Subject to any disclaimer, the term of this patent is extended or adjusted under 35 U.S.C. 154(b) by 25 days.

This patent is subject to a terminal disclaimer.

(21) Appl. No.: 15/933,941

(22) Filed: Mar. 23, 2018

(65) Prior Publication Data

US 2018/0274105 A1  Sep. 27, 2018

Related U.S. Application Data

(60) Provisional application No. 62/477,212, filed on Mar. 27, 2017, provisional application No. 62/502,203, filed on May 5, 2017.

(51) Int. Cl.
*C23F 11/12* (2006.01)
*C23F 11/167* (2006.01)
(Continued)

(52) U.S. Cl.
CPC .......... *C23F 11/126* (2013.01); *C23F 11/08* (2013.01); *C23F 11/167* (2013.01);
(Continued)

(58) Field of Classification Search
CPC ..... C23F 11/126; C23F 11/1676; C23F 11/08; C23F 11/167; C23F 11/18; C23F 11/173
See application file for complete search history.

(56) References Cited

U.S. PATENT DOCUMENTS 4,277,359 A * 7/1981 Lipinski .......... C23F 11/08
  210/699
5,376,331 A * 12/1994 Bucher .......... C23F 11/08
  210/697

(Continued)

FOREIGN PATENT DOCUMENTS

CA  2252060 A1 * 5/2000 ........... C02F 5/105
EP  2492372 A1   8/2012
(Continued)

OTHER PUBLICATIONS

TotalMateria http://www.totalmateria.com/articles/Art62.htm (Nov. 2001)) (Year: 2001).*

*Primary Examiner* — Pamela H Weiss
(74) *Attorney, Agent, or Firm* — Mossman, Kuman & Tyler, P.C.

(57) ABSTRACT

An additive comprising one or more $C_3$-$C_{12}$ hydroxycarboxylic acids and/or one or more $C_3$-$C_{12}$ hydroxycarboxylic acid salts may be added to an aqueous system having galvanized metallurgy or a carbon steel surface in an effective amount to passivate a galvanized coating on the metallurgy or to decrease white rust formation or other types of corrosion upon the galvanized metallurgy or carbon steel surface in an aqueous system. In a non-limiting embodiment, the $C_3$-$C_{12}$ hydroxycarboxylic acid or the $C_3$-$C_{12}$ hydroxycarboxylic acid salt additive may utilize the zinc in
(Continued)

the galvanized coating to achieve passivation. The passivation may occur while the system is shut down or in service. The aqueous system may be or include a cooling tower, a cooling water system, and combinations thereof. The additive may be used with or in the absence of a phosphorous-containing compound.

15 Claims, 4 Drawing Sheets
(4 of 4 Drawing Sheet(s) Filed in Color)

(51) Int. Cl.
    *C23F 11/08*       (2006.01)
    *C23F 11/173*     (2006.01)
    *C23F 11/18*       (2006.01)

(52) U.S. Cl.
    CPC ......... *C23F 11/1676* (2013.01); *C23F 11/173* (2013.01); *C23F 11/18* (2013.01)

(56) References Cited

U.S. PATENT DOCUMENTS

| | | | | |
|---|---|---|---|---|
| 5,589,106 A * | 12/1996 | Shim | ............... | C23F 11/08 252/387 |
| 5,886,042 A * | 3/1999 | Yu | ............... | A61K 8/26 424/401 |
| 6,277,302 B1 * | 8/2001 | Fan | ............... | C09K 15/02 252/389.52 |
| 6,585,933 B1 * | 7/2003 | Ehrhardt | ............... | C23F 11/08 252/180 |
| 2005/0245411 A1 | 11/2005 | Yang et al. | | |
| 2007/0010404 A1 * | 1/2007 | Welton | ............... | C09K 8/54 507/267 |
| 2007/0164258 A1 * | 7/2007 | Emerson | ............... | C02F 5/086 252/387 |
| 2009/0069202 A1 * | 3/2009 | Stapp | ............... | C02F 1/683 507/224 |
| 2013/0078382 A1 * | 3/2013 | Hofmann | ............... | C23C 22/362 427/372.2 |
| 2014/0360630 A1 | 12/2014 | Arnold et al. | | |
| 2015/0368592 A1 * | 12/2015 | Cabanas | ............... | C11D 3/0073 134/22.13 |
| 2015/0376041 A1 * | 12/2015 | Felipe | ............... | C01B 5/00 423/269 |
| 2015/0376799 A1 * | 12/2015 | Felipe | ............... | C02F 1/68 423/269 |
| 2016/0146734 A1 * | 5/2016 | Felipe | ............... | G01N 21/64 250/459.1 |
| 2016/0229726 A1 * | 8/2016 | Felipe | ............... | C09K 15/322 |

FOREIGN PATENT DOCUMENTS

| | | | |
|---|---|---|---|
| JP | 2010521581 A | 6/2010 | |
| WO | WO-2005033365 A1 * | 4/2005 | ............... C23G 1/00 |

* cited by examiner

Passivated galvanized steel

Passivated Carbon steel

CORROSION INHIBITORS FOR PASSIVATION OF GALVANIZED COATINGS AND CARBON STEEL

CROSS-REFERENCE TO RELATED APPLICATION

This application claims the benefit of Provisional Patent Application No. 62/477,212 filed Mar. 27, 2017 and Provisional Patent Application No. 62/502,203 filed May 5, 2017, both of which are incorporated by reference herein in their entirety.

TECHNICAL FIELD

The present invention relates to methods and compositions to improve passivation of galvanized coatings of various metallurgy and carbon steel-based metallurgy, and in a more specific, non-limiting embodiment relates to methods and compositions to improve the passivation of galvanized coatings and carbon steel metallurgy regularly used in aqueous systems, to help reduce white rust formation and to inhibit overall corrosion of metallurgy in an aqueous system.

BACKGROUND

Passivation of galvanized coatings, carbon steel, and other metallurgy used on pipes and equipment employed in aqueous systems is a complex, time-consuming process because of the susceptibility of galvanized metallurgy and carbon steel, in particular, to corrosion and the inconvenient chemical conditions involved.

Forming a proper passivation layer on a galvanized coating or other metallurgy, such as carbon steel, involves a lot of time and must be conducted under very specific conditions, which is costly and often leads to delays in system start-up. For these same reasons, passivation typically cannot occur while the metallurgy is in service in an aqueous system.

Attempting to expedite the passivation process or not maintaining the required water condition during passivation can result in poor passivation and the formation on the galvanized coating of as "white rust," which is a natural corrosion of the zinc in the coating applied to metallurgy. Current guidelines on mitigating white rust formation only include aqueous systems that have chlorides lower than 250 ppm. These guidelines cover systems with up to a pH level of 8.0, which are at a higher risk of forming white rust.

In addition, there is always a concern to better protect metal surfaces that exist within an aqueous system against corrosion in general, such as rusting, as well as pitting corrosion, a specific type of corrosion concentrated in a certain area that forms a pit or divot in the surface of the metal. Corrosion, if unattended, may result in failure or destruction of the metal, causing the particular water system to be shut down until the necessary repairs can be made.

Aqueous systems often have cooling water systems for cooling a water stream to a lower temperature and rejecting heat to the atmosphere. Typically, in cooling water systems, corrosion along with pitting has proven deleterious to the overall efficiency of the system.

Many cooling water systems employ orthophosphate to decrease corrosion by promoting passivation of the metal surfaces in contact with the system water. However, current costs of phosphorous-based inhibitors have increased due to increased demand of $P_2O_5$ ores for agricultural fertilizers. Also, environmental regulations in the United States, Europe, and China have increased restriction on phosphate discharge into local rivers and streams. Accordingly, the number of low or no phosphate treatment programs have been increasing with a concurrent emphasis on all or predominantly organic treatment programs.

Zinc has also been used to inhibit corrosion of metals, apart from its use in galvanization, and soluble zinc salts are ingredients of many corrosion treatment programs. However, zinc salts may precipitate, particularly in cooling water. For example, when orthophosphate and zinc are both present in an aqueous system, zinc phosphate precipitation becomes a concern. Precipitation of zinc in other forms may also occur, such as zinc oxide or zinc sulfate. In alkaline waters, particularly above about pH 7.5, dissolved zinc tends to deposit out or drop out. Zinc salts are also known to be unstable in neutral or alkaline water and will precipitate with phosphates. Thus, if any of these conditions are present, the aqueous system becomes prone to zinc precipitation. With the formation of zinc scale, many of the surfaces in contact with the aqueous system may foul, and the amount of effective corrosion inhibitor present in the aqueous system may be significantly decreased.

Moreover, new industrial and commercial cooling tower water systems often experience serious corrosion within the first year of their operation. The corrosion can be prevented with proper pre-start up cleaning or passivation of these systems. A typical way of passivating employs phosphate-based materials. However, to become an effective passivator, a high amount of phosphate dosage is needed. After the pre-start-up and before adding heat in the cooling system, the phosphate needs to be discarded to prevent the calcium phosphate scaling and biological growth that can cause microbiologically-induced corrosion. Further, blowing down high amount of phosphate to a wastewater plant requires adding a precipitant of phosphate to remove and prevent the release of a high amount phosphate to discharge streams like rivers and lakes.

Thus, it is desirable to employ more economical, effective white rust inhibitor covering a wider range of conditions, like pH greater than 8, and in aqueous systems having higher chloride concentrations, and to utilize more environmentally-friendly methods and additives for properly passivating galvanized coatings on equipment and other metallurgy, such as carbon steel, used in aqueous systems to inhibit white rust formation and for overall reduction in corrosion of metal surfaces in an aqueous system.

SUMMARY

There is provided, in one form, a method for adding at least one $C_3$-$C_{12}$ hydroxycarboxylic acid and/or at least one $C_3$-$C_{12}$ hydroxycarboxylic acid salt to an aqueous system having galvanized metallurgy or carbon steel surfaces in an effective amount, to reduce or prevent white rust formation and/or corrosion within the aqueous system as compared to an otherwise identical aqueous system absent the at least one $C_3$-$C_{12}$ hydroxycarboxylic acid or at least one $C_3$-$C_{12}$ hydroxycarboxylic acid salt. In one non-limiting embodiment the effective amount ranges from about 5 ppm to about 500 ppm based on the total amount of fluids in the aqueous system, In another non-limiting embodiment, there is a method for passivating a galvanized coating comprising zinc by applying to the coating a solution or additive, the solution or additive comprising at least one $C_3$-$C_{12}$ hydroxycarboxylic acid and/or at least one $C_3$-$C_{12}$ hydroxycarboxylic acid salt, wherein the zinc in the galvanized coating may be utilized by the at least one $C_3$-$C_{12}$ hydroxycarboxylic acid and/or the at least one $C_3$-$C_{12}$ hydroxycarboxylic acid salt for passivation. In an alternative embodiment, this method for passivating may occur within an aqueous system while the metallurgy comprising the galvanized coating is in service.

In another non-limiting embodiment, there is a method for passivating a galvanized coating comprising zinc or carbon steel surfaces by applying a solution or additive comprising at least one $C_3$-$C_{12}$ hydroxycarboxylic acid and/or at least one $C_3$-$C_{12}$ hydroxycarboxylic acid salt and may also comprise of low amount of a phosphorous-containing compound.

In yet another non-limiting embodiment, there is provided a treated aqueous system, wherein the aqueous system comprises about 5 ppm to about 500 ppm of at least one $C_3$-$C_{12}$ hydroxycarboxylic acid or at least one $C_3$-$C_{12}$ hydroxycarboxylic acid salt and has a decreased amount of at least one characteristic selected from the group consisting of white rust formation, corrosion, and combinations thereof as compared to an otherwise identical aqueous system absent the at least one $C_3$-$C_{12}$ hydroxycarboxylic acid or the at least one $C_3$-$C_{12}$ hydroxycarboxylic acid salt. The treated aqueous system may also optionally include a scale inhibitor, a phosphorous-containing compound, a biocide, a chlorine-containing component, and/or a taggant.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1:
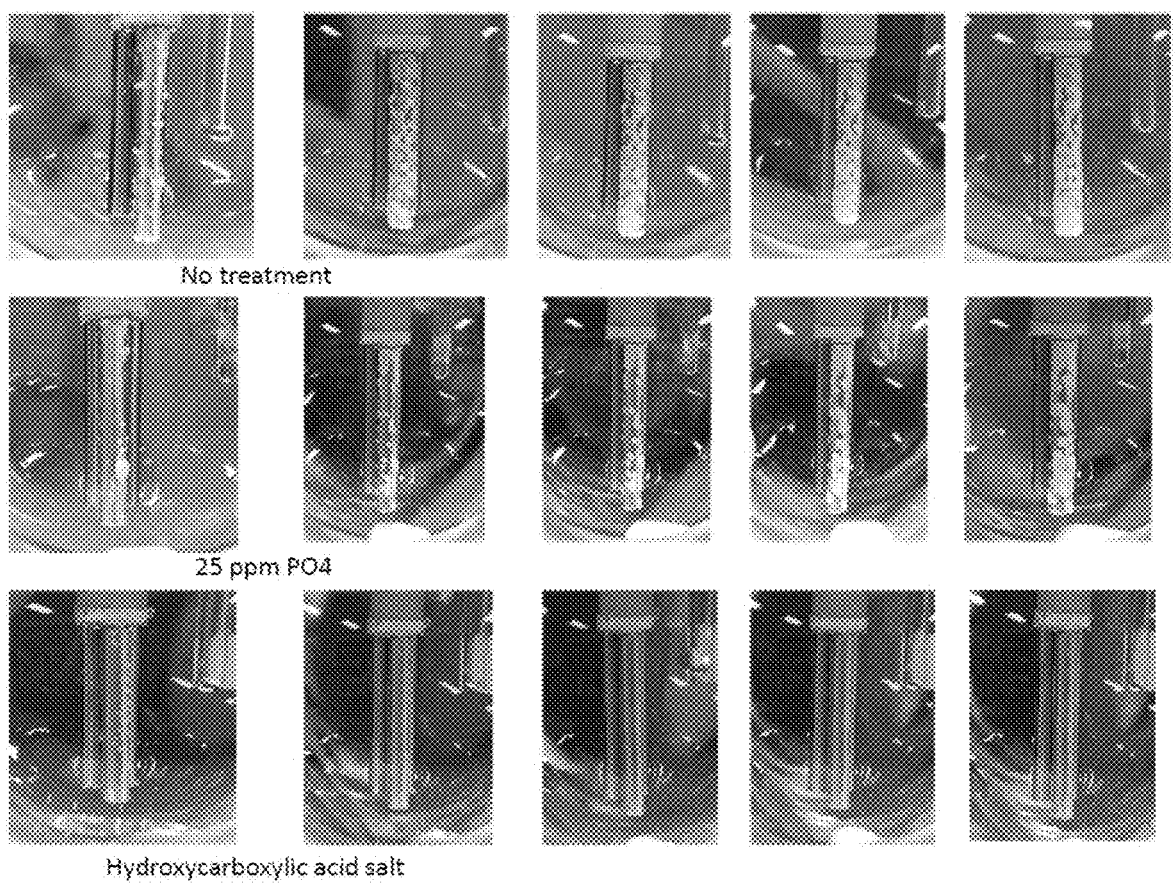
FIG. 1 is a photographic illustration comparing the formation of white rust on galvanized metallurgy in the presence of no treatment chemicals versus in the presence of passivation treatment chemicals.

It has been discovered that an additive comprising one or more $C_3$-$C_{12}$ hydroxycarboxylic acids and/or one or more $C_3$-$C_{12}$ hydroxycarboxylic acid salts may be added to an aqueous system having galvanized metallurgy or carbon steel to more effectively and efficiently passivate a galvanized coating on the metallurgy or a carbon steel surface, or to more effectively decrease white rust formation and/or inhibit overall corrosion in an aqueous system. Without being limited to any particular mechanism, it is believed that, in some instances, the $C_3$-$C_{12}$ hydroxycarboxylic and/or the $C_3$-$C_{12}$ hydroxycarboxylic acid salt additive may utilize the zinc in the galvanized coating to achieve passivation thus shortening the time needed for passivation of the galvanized coating and reducing the occurrence of white rust.

As used herein, metallurgy is any metal surface that may be galvanized, i.e. protected with a coating comprising zinc that helps to shield the metal surface from corrosion. The types of metal surface include, but are not limited to, an iron-containing surface, such as steel; carbon steel; an aluminum-containing surface; yellow metal surfaces, such as copper and copper alloys; and combinations thereof.

"Aqueous system" is defined herein to include an aqueous-based fluid and any components or any metallurgy (e.g. pipes or conduits) that may be galvanized through which the aqueous fluid may flow or along or outside of which the aqueous fluid may flow. The aqueous-based fluid may be or include, but is not limited to, water, brine, seawater, and combinations thereof. In a non-limiting embodiment, the aqueous based fluid may circulate through a cooling tower, a cooling water system, an air-conditioning system, a wastewater treatment system, a deionized water system, and combinations thereof. The cooling tower may be or include an open loop cooling tower, a closed loop cooling tower, and combinations thereof. 'Open loop' differs from 'closed loop' in that the 'open loop' system has recirculating water therethrough. The pH of the aqueous system may be greater than about 7, alternatively from about 7 independently to about 9, or from about 7.3 independently to about 8.7 in another non-limiting embodiment.

The additive may be comprised of at least one $C_3$-$C_{12}$ hydroxycarboxylic acid and/or at least one $C_3$-$C_{12}$ hydroxycarboxylic acid salt.

The $C_3$-$C_{12}$ hydroxycarboxylic acid may be, but is not limited to, saccharic acid, citric acid, tartaric acid, mucic acid, gluconic acid, glycolic acid, hydroxymalonic acid, and combinations thereof.

The $C_3$-$C_{12}$ hydroxycarboxylic acid may be, but is not limited to, saccharic acid salt, citric acid salt, tartaric acid salt, mucic acid salt, gluconic acid salt, glycolic acid salt, hydroxymalonic acid salt, and combinations thereof.

The amount of the at least one hydroxycarboxylic acid or the at least one hydroxycarboxylic acid salt to be added may range from about 5 ppm independently to about 500 ppm, alternatively from about 15 ppm independently to about 300 ppm, or from about 50 ppm independently to about 100 ppm. As used herein with respect to a range, "independently" means that any threshold may be used together with another threshold to give a suitable alternative range, e.g. about 5 ppm independently to about 100 ppm is also considered a suitable alternative range.

The hydroxycarboxylic acid(s) and/or the hydroxycarboxylic acid salt(s) additive may inhibit, suppress, or reduce the amount of corrosion within the aqueous system containing a galvanized or carbon steel surface or the amount of white rust formation on a galvanized coating. That is, it is not necessary for corrosion to be entirely prevented for the methods or systems discussed herein to be considered effective, although complete prevention is a desirable goal. Success is obtained if less corrosion occurs using the additive than in the absence of the additive. Alternatively, the methods and systems described are considered successful if there is at least a 50% decrease in white rust formation and/or other corrosion within the aqueous system or upon the galvanized coating.

In a non-limiting embodiment, the zinc in the galvanized coating can be utilized by the at least one $C_3$-$C_{12}$ hydroxycarboxylic acid or the at least one $C_3$-$C_{12}$ hydroxycarboxylic acid salt for the passivation process and may result in improved anti-white rust corrosion performance and shorter passivation time. In addition, the method for applying the additive for passivating a galvanized coating may occur within an aqueous system while the metallurgy comprising the galvanized coating is in service under the conditions recommended by galvanized equipment manufacturers. In an alternative embodiment, the method for applying the additive for passivating a galvanized coating may be performed when the system is shut down.

In one non-limiting embodiment, the additive and/or the aqueous system may include a phosphorous-containing compound, such as but not limited to, phosphinocarboxylic acid, phosphinocarboxylic acid salt, orthophosphates, polyphosphates, phosphonates, HPA, HEDP, and combinations thereof, and/or may include zinc or a zinc salt. For example, adding 5-10 ppm phosphinocarboxylic acid salt with the hydroxycarboxylic acid salt has been shown to inhibit white rust formation.

Alternatively, the additive and methods described herein may have an absence of an added phosphorous-containing compound, and/or an absence of added zinc and/or an added zinc salt.

At least one additional component may be included in the aqueous system. The additional component may be or include, but is not limited to, a scale inhibitor, a biocide, a taggant, a yellow metal corrosion inhibitor, and combinations thereof. The scale inhibitor may be or include, but is not limited to, polyacrylates, polymaleates, hydroxypropylacrylates, phosphonates, and combinations thereof. The polyacrylates may be or include homopolymers, copolymers, terpolymers, and combinations thereof. The scale inhibitor may be present in the aqueous system or may be added to the aqueous system in an amount ranging from about 1 ppm independently to about 100 ppm, alternatively from about 5 ppm independently to about 50 ppm, or from about 10 ppm independently to about 25 ppm in another non-limiting embodiment. In the alternative, the aqueous system and/or additive does not include polyacrylates or other polymer components.

The amount of phosphorous-containing components within the aqueous system prior to the addition of the additive may be less than 10 ppm, or less than about 2 ppm in another non-limiting embodiment. Alternatively, the amount of phosphorous-containing components within the aqueous system may range from about 0 independently to about 0.1 ppm or independently to about 0.2 ppm. It should be understood that in this non-limiting embodiment, the phosphorous-containing components do not include the phosphate compounds previously discussed; for instance do not include phosophonates.

The biocide may be or include, but is not limited to, sodium hypochlorite (also known as bleach), NaHClO, chlorine dioxide, chlorine, bromine, non-oxidizing biocides, and combinations thereof. Non-limiting examples of the non-oxidizing biocides may be or include isothiazoline; glutaraldehyde; 2,2-dibromo-3-nitrilopropionamide (DB-NPA); and combinations thereof. The amount of the biocide present in the aqueous system or added to the aqueous system may range from about 1 ppm independently to about 100 ppm, alternatively from about 5 ppm independently to about 50 ppm, or from about 10 ppm independently to about 25 ppm in another non-limiting embodiment.

In a non-limiting embodiment, a chemical taggant may be attached to at least one of the components for purposes of tracing the component added to or present in the aqueous system, such as the hydroxycarboxylic acid or the hydroxycarboxylic acid salt, the biocide, the scale inhibitor, and combinations thereof. The chemical tag may be or include a fluorophore in a non-limiting embodiment, i.e. a chemical that emits light at a certain wavelength of light. The chemical taggant or tag may be or include a tagged polymer, p-Toluenesulfonic acid (pTSA), the scale inhibitor itself as a tag, and combinations thereof. Said differently, the scale inhibitor may act as a fluorophore when added to the aqueous system. Non-limiting examples of the scale inhibitor that may act as a fluorophore may be or include BEL-CLENE 200™ supplied by BWA Water Additives (a calcium carbonate scale inhibitor), OPTIDOSE™ supplied by DOW Chemical Company (a calcium phosphate scale inhibitor), and combinations thereof. The chemical tag may emit light at wavelengths ranging from about 180 independently to about 600, or from about 240 independently to about 350.

The chemical tag may be added to the system at the same time or different time from the additive. The amount of the chemical tag added to the aqueous system may range from about 1 ppb independently to about 10 ppm, or from about 500 parts per billion (ppb) independently to about 6 ppm in another non-limiting embodiment. Alternatively, the amount of the 'inherent tag' added to the aqueous system may range from about 1 ppm independently to about 15 ppm, or from about 2 ppm independently to about 6 ppm. In another non-limiting embodiment, the amount of pTSA added to the aqueous system may range from about 1 ppb independently to about 4 ppm, or from about 100 ppb independently to about 1 ppm.

The aqueous system may be stable in the presence of chlorine-containing components, such as chloride salts. The chlorine-containing components may be present in the aqueous system prior to the addition of the hydroxycarboxylic acid(s) or hydroxycarboxylic acid salt(s). Alternatively, the chlorine-containing components may be added to the aqueous system at the same time or different time as the additive disclosed here and be in an amount ranging from about 1 ppm independently to about 1,000 ppm, alternatively from about 50 ppm independently to about 800 ppm, or an amount greater than about 50 ppm in another non-limiting embodiment. The aqueous system may also comprise a calcium component, such as in the form of $CaCO_3$, in an amount less than 200 ppm.

The invention will be further described with respect to the following Examples, which are not meant to limit the invention, but rather to further illustrate the various embodiments.

Example 1

FIG. 1 is a photographic illustration comparing the formation of white rust on galvanized metallurgy in presence of no treatment chemicals versus in the presence of other treatment chemicals.

The top row of photographs shows the amount of formation of white rust on various galvanized metallurgy samples in which no treating additive was applied.

The middle row of photographs shows the amount of white rust formation when 25 ppm of phosphate was applied to the samples.

The bottom row of photograph illustrates the amount of white rust formation when a hydroxycarboxylic acid salt mixture was applied.

The illustrations demonstrate that the hydroxycarboxylic acid salt additive was the most effective in reducing the formation of white rust on the galvanized metallurgy samples.

Example 2

Figure 2:
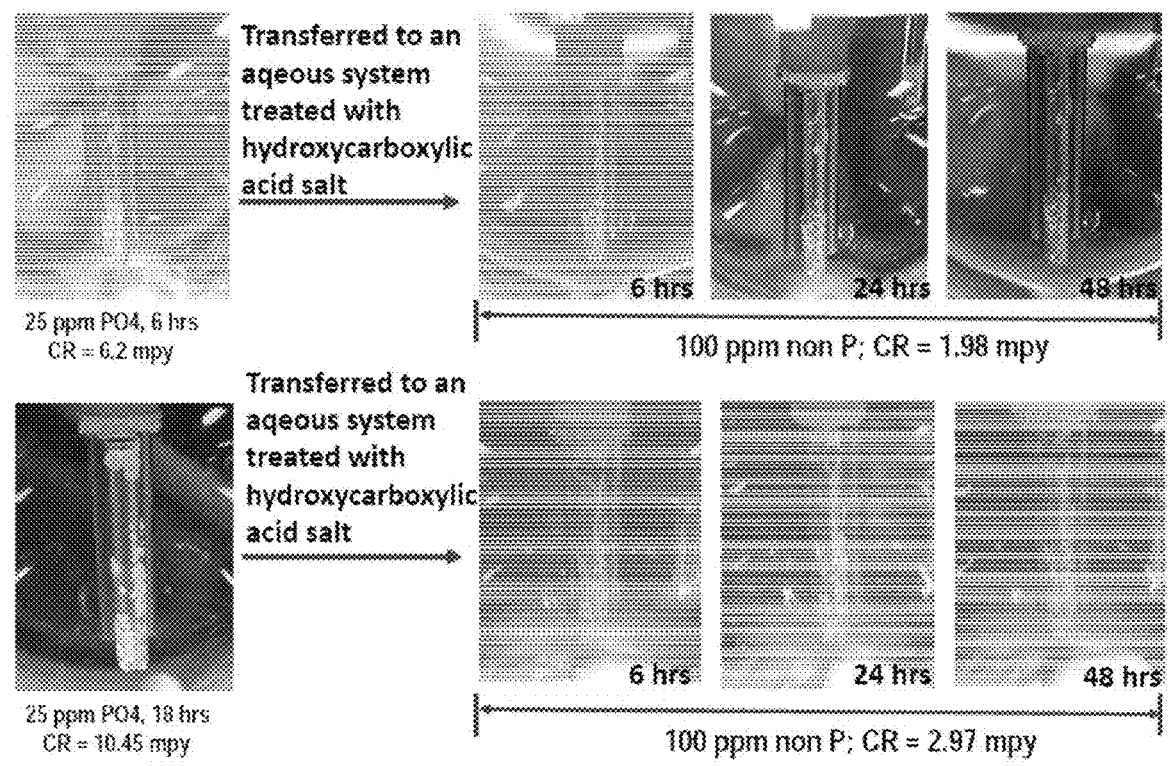
FIG. 2 is a photographic illustration comparing the formation of white rust on galvanized metallurgy using a phosphate treatment versus using a non-phosphate, hydroxycarboxylic acid salt treatment.

FIG. 2 is a photographic illustration comparing the formation of white rust on galvanized metallurgy using a phosphate treatment versus using a non-phosphate, hydroxycarboxylic acid salt treatment.

The photographs on the left illustrate the performance of two 25 ppm samples of phosphate additive, which were added to galvanized metallurgy suspended in an aqueous solution and allowed to remain in contact for 6 hours and 18 hours. After 6 hours, the corrosion rate was 6.2 mpy, and white rust formation was observed. After 18 hours, the corrosion rate was 10.45 mpy, and significantly more white rust formation was observed.

The photographs on the right illustrate the performance of two 100 ppm samples of a hydroxycarboxylic acid salt treatment. These two samples were also added to galvanized metallurgy suspended in an aqueous solution and allowed to remain in contact for 6 hours and 18 hours. After 6 hours, the corrosion rate was 1.98 mpy, and very little white rust formation was observed. After 18 hours, the corrosion rate was 2.97 mpy, and significantly less white rust formation was observed as compared to amount of white rust formed when the 18-hour 25 ppm sample of the phosphate additive was tested.

The photographs in FIG. 2 demonstrate that the hydroxycarboxylic acid salt treatment was significantly more effective in reducing corrosion and formation of white rust than the phosphate additive treatment.

Example 3

Figure 3:
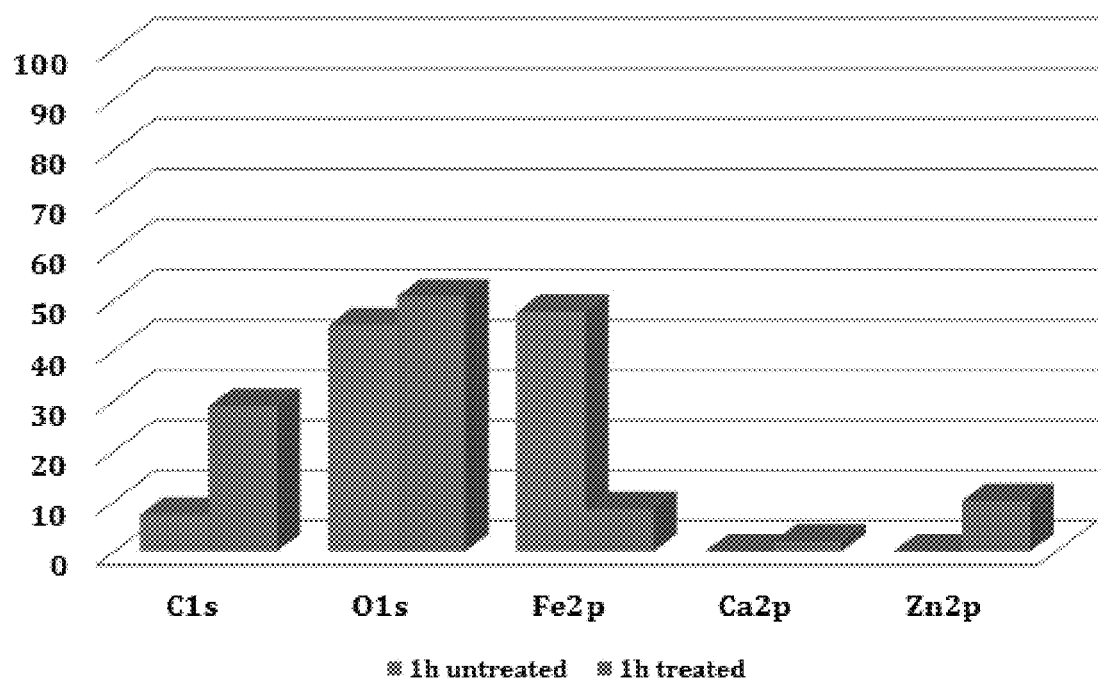
FIG. 3 is a graph showing the atomic concentration of untreated vs. treated carbon steel surface from an X-ray photoelectron spectrometer.

FIG. 3 is a graph showing the atomic concentration of untreated vs. treated carbon steel surface from an X-ray photoelectron spectrometer.

X-ray photoelectron spectroscopy is a method capable of identifying the chemical species found on a surface. In FIG. 3, increase in the amount of carbon (C) and zinc (Zn) on the surface show the presence of the chemical treatment on the carbon steel surface. Further, the decrease in the amount of iron (Fe), shows that the carbon steel surface is being covered by the chemical treatment.

Example 4

Figure 4:
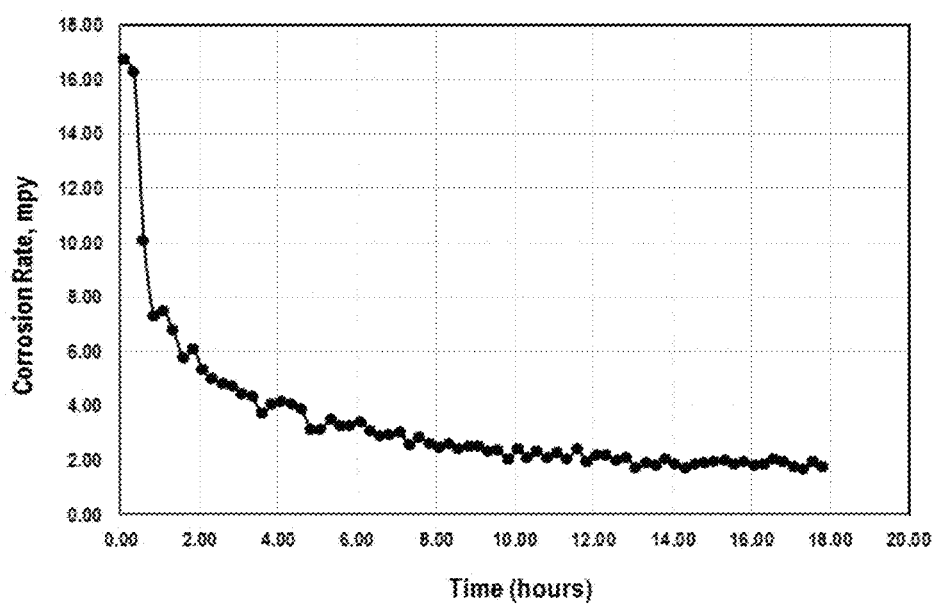
FIG. 4 is a graph showing the corrosion rate of a galvanized metal coupon treated with a hydroxycarboxylic acid and hydroxycarboxylic acid salt additive of the present disclosure.

FIG. 4 is a graph showing the corrosion inhibition rate in mils per year (MPY) of a galvanized coupon in an aqueous system having about 40 ppm Ca in the form of $CaCO_3$ water hardness and a pH of 8.7 that has been treated with a saccharic acid salt mainly, with some gluconic acid salt, mucic acid, and hydroxymalonic acid salt. As is shown in FIG. 4, the corrosion rate within the first two hours of treatment and continues to gradually decrease after that.

Example 5

Figure 5:
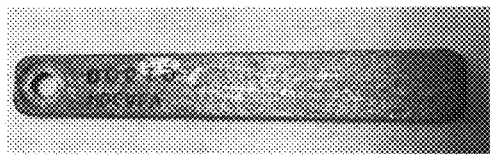
FIG. 5 is a photographic illustration showing the passivation of a galvanized coupon and a carbon steel coupon that have been treated with a hydroxycarboxylic acid and hydroxycarboxylic acid salt additive of the present disclosure.
Figure 5:
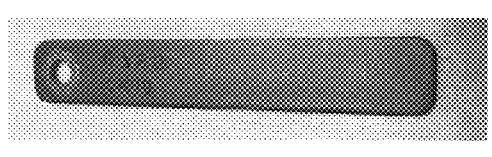

FIG. 5 are photographs of a passivated galvanized coupon and carbon steel coupon that were exposed in a cooling tower at a pH ranging from 7.0 to 7.6. The cooling water stream includes <200 ppm Ca in the form of $CaCO_3$, ≤5500 umhos conductivity, 50-150 ppb taggant, and ≤1 ppm free chlorine biocide. These coupons were also treated with saccharic acid salt mainly, with some gluconic acid salt, mucic acid, and hydroxymalonic acid salt. The photographs show a grayish passivation layer on the galvanized coupon and a bluish film on the carbon steel coupon.

In the foregoing specification, the invention has been described with reference to specific embodiments thereof. However, it will be evident that various modifications and changes can be made thereto without departing from the broader spirit or scope of the invention as set forth in the appended claims. Accordingly, the specification is to be regarded in an illustrative rather than a restrictive sense. For example, metallurgy, coatings, equipment, specific aqueous fluids, hydroxycarboxylic acids, hydroxycarboxylic acid salts, components, scale inhibitors, biocides, and chlorine-containing components falling within the claimed parameters, but not specifically identified or tried in a particular composition or method, are expected to be within the scope of this invention.

The present invention may suitably comprise, consist or consist essentially of the elements disclosed and may be practiced in the absence of an element not disclosed. For example, the methods may consist of or consist essentially of adding at least one $C_3$-$C_{12}$ hydroxycarboxylic acid at least one $C_3$-$C_{12}$ hydroxycarboxylic acid salt in an effective amount to passivate a galvanized coating or other metallurgy to decrease white rust or corrosion in an aqueous system.

In another non-limiting embodiment, the additive may comprise, consist essentially of, or consist of at least one $C_3$-$C_{12}$ hydroxycarboxylic acid and/or at least one $C_3$-$C_{12}$ hydroxycarboxylic acid salt.

In a different non-restrictive version, a treated aqueous system may comprise, consist essentially of, or consist of, an aqueous system and an additive comprising at least one $C_3$-$C_{12}$ hydroxycarboxylic acid in an amount ranging from about 5 ppm to about 500 ppm based on a total amount of fluid in the aqueous system or at least one $C_3$-$C_{12}$ hydroxycarboxylic acid salt in an amount ranging from about 5 ppm to about 500 ppm based on a total amount of fluid in the aqueous system, wherein the treated aqueous composition comprises a decreased amount of at least one characteristic selected from the group consisting of white rust formation, other types of corrosion, and combinations thereof as compared to an otherwise identical aqueous system absent the additive As used herein, the terms "comprising," "including," "containing," "characterized by," and grammatical equivalents thereof are inclusive or open-ended terms that do not exclude additional, unrecited elements or method acts, but also include the more restrictive terms "consisting of" and "consisting essentially of" and grammatical equivalents thereof. As used herein, the term "may" with respect to a material, structure, feature or method act indicates that such is contemplated for use in implementation of an embodiment of the disclosure and such term is used in preference to the more restrictive term "is" so as to avoid any implication that other, compatible materials, structures, features and methods usable in combination therewith should or must be, excluded.

As used herein, the singular forms "a," "an," and "the" are intended to include the plural forms as well, unless the context clearly indicates otherwise.

As used herein, the term "and/or" includes any and all combinations of one or more of the associated listed items.

As used herein, the term "about" in reference to a given parameter is inclusive of the stated value and has the meaning dictated by the context (e.g., it includes the degree of error associated with measurement of the given parameter).

What is claimed is:

1. A method comprising:
adding an additive comprising saccharic acid salt, gluconic acid salt, mucic acid, and hydroxymalonic acid salt to an aqueous system having a galvanized surface, the amount of the additive being effective to inhibit white rust formation and/or corrosion within the aqueous system as compared to an otherwise identical aqueous system absent the additive.

2. The method of claim 1, wherein the effective amount of the additive ranges from about 5 ppm to about 500 ppm based on a total amount of fluid in the aqueous system.

3. The method of claim 1, wherein the effective amount of the additive ranges from about 15 ppm to about 500 ppm based on a total amount of fluid in the aqueous system.

4. The method of claim 1, wherein the aqueous system is selected from the group consisting of a cooling tower, a cooling water system, and combinations thereof.

5. The method of claim 1, wherein the aqueous system further comprises at least one additional component selected from the group consisting of a scale inhibitor, a biocide, a chlorine-containing component, a taggant, a phosphorous compound, and combinations thereof.

6. The method of claim 5 wherein the phosphorous compound is selected from a group consisting of phosphinocarboxylic acid, phosphinocarboxylic acid salt, polyphosphates, phosphonates and combinations and is present in a concentration of 10 ppm or less.

7. The method of claim 5, wherein the scale inhibitor is selected from the group consisting of polyacrylates, polymaleates, phosphinocarboxylic acid, salts of these compounds, and combinations thereof.

8. The method of claim 5, wherein the biocide is selected from the group consisting of sodium hypochlorite, chlorine dioxide, chlorine, bromine, non-oxidizing biocides, and combinations thereof.

9. The method of claim 1, wherein the aqueous system has a pH greater than about 7.

10. The method of claim 1, wherein the aqueous system further comprises a chlorine-containing component in an amount greater than about 50 ppm.

11. The method of claim 1, wherein the aqueous system further comprises a calcium component in an amount less than 200 ppm.

12. A treated aqueous system comprising:
an aqueous system comprising a galvanized surface; and
an additive comprising saccharic acid salt, gluconic acid salt, mucic acid, and hydroxymalonic acid salt in an amount ranging from about 5 ppm to about 500 ppm based on a total amount of fluid in the aqueous system;
wherein the treated aqueous composition comprises a decreased amount of at least one characteristic selected from the group consisting of white rust formation upon the galvanized surface, corrosion of the galvanized surface, and combinations thereof as compared to an otherwise identical aqueous system absent the additive.

13. The treated aqueous system of claim 12, wherein the aqueous system is selected from the group consisting of a cooling tower, a cooling water system, and combinations thereof.

14. The treated aqueous system of claim 13, wherein the aqueous system further comprises at least one additional component selected from the group consisting of a scale inhibitor, a biocide, a chlorine-containing component, a taggant, a phosphorous compound, and combinations thereof.

15. The treated aqueous system of claim 12, wherein the scale inhibitor is selected from the group consisting of polyacrylates, polymaleates, phosphinocarboxylic acid, salts of these compounds, and combinations thereof.

* * * * *